United States Patent [19]

Kress

[11] 4,026,430

[45] May 31, 1977

[54] SCRAP BOX CARRIER

[76] Inventor: Edward S. Kress, P.O. Box 368, Brimfield, Ill. 61517

[22] Filed: Aug. 25, 1975

[21] Appl. No.: 607,355

[52] U.S. Cl. .................................. 214/313; 298/11
[51] Int. Cl.² ......................................... B65G 65/04
[58] Field of Search .......... 214/314, 312, 300, 390, 214/502, 315; 298/10, 11

[56] References Cited

UNITED STATES PATENTS

| 3,520,429 | 7/1970 | Anderson | 214/314 |
|---|---|---|---|
| 3,731,829 | 5/1973 | Wegenblast et al. | 214/314 |

Primary Examiner—Lawrence J. Oresky
Attorney, Agent, or Firm—Leydig, Voit, Osann, Mayer & Holt, Ltd.

[57] ABSTRACT

A mobile carrier for large scrap steel carrying boxes including a main wheeled frame with steerable, powered wheels and a support or tilt frame suspended on the main frame for vertical movement. The tilt frame fits around and locks to the box with the box itself forming a structural member preventing spreading of the frame. Hydraulic actuators suspend the tilt frame allowing it to pick up a box, carry it with the main frame, and tilt the box to dump the scrap contents.

10 Claims, 5 Drawing Figures

SCRAP BOX CARRIER

This invention relates generally to material handling vehicles and more particularly concerns a carrier for handling and dumping large heavy loads.

Steel making processes require weighing a desired quantity of scrap steel and dumping that quantity into the converter. One technique is to accumulate processed scrap in large "boxes", i.e., open ended, self-supporting troughs. The scrap-filled box is then weighed and the amount of carried scrap trimmed to reach the desired weight for a given converter charge, and then the trimmed box is transported to the converter and tilted to dump the scrap into the steel making vessel.

Keeping in mind that a scrap box is often over 30 feet long, that when loaded with scrap can gross over 300,000 pounds, that the loaded box must be transported some distance — one-half of a mile is typical — and that the box must be tilted to a sharp angle to dump the scrap, it can be appreciated that handling such boxes present special problems. Moreover, such boxes are normally used in rather confined spaces providing little clearance above or to either side of the box.

Accordingly, it is the primary aim of the invention to provide a scrap box carrier that will lift a loaded box from the ground, transport it at reasonable speed at a slight angle to prevent scrap spillage, lower it vertically onto a scale for weighing and trimming, again transport the trimmed box to a converter, and then tilt the box so as to dump the scrap contents into the converter vessel.

It is an object of the invention to provide a carrier of the above type that is relatively light, quite maneuverable, and capable of handling empty and loaded boxes as described without auxiliary cranes or lifts. A further object is to provide a carrier as characterized above which utilizes hydraulic power but which minimizes required hydraulic pressures when maximum pay load forces are encountered, i.e., when transporting loaded boxes.

Another object is to provide a carrier of the above character which operates by closely surrounding the box so that scrap boxes can be handled in rather confined spaces.

Other objects and advantages of the invention will become apparent upon reading the following detailed description and upon reference to the drawings, in which.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
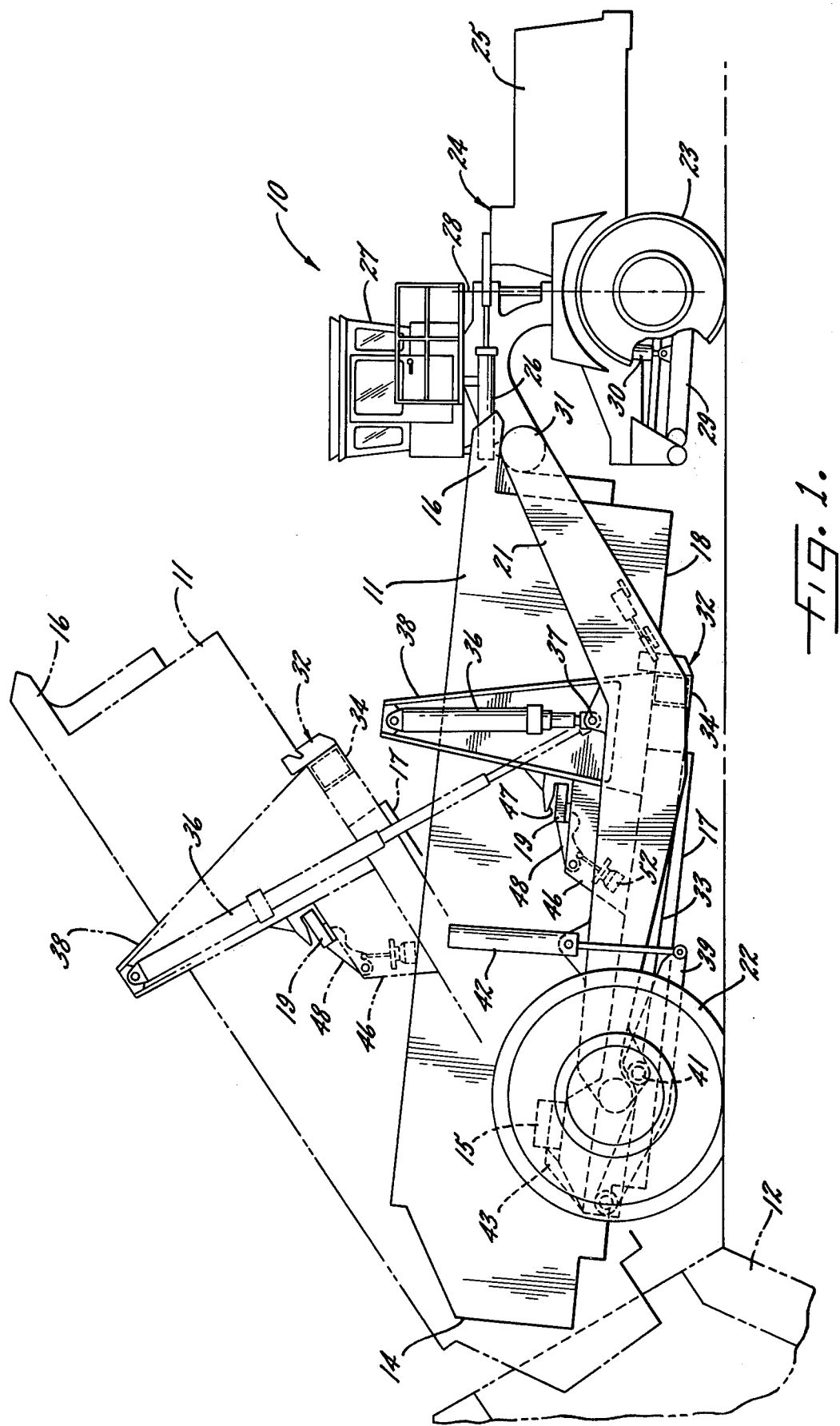
FIG. 1 is a side elevation of a carrier embodying the invention and supporting, and dumping, a scrap filled box.

Turning to the drawings, a carrier 10 embodying the invention is shown in FIG. 1 both carrying a scrap containing box 11, in solid lines, and tilting that box, in dashed lines, to dump the box contents into a steel making vessel 12.

The box 11 which the carrier is adapted to handle consists of an inner trough 13 roughly semi-circular in cross section whose wall is heavily reinforced and closed at one end so that the outer shape is box-like with an open end 14. The box includes laterally extending support lugs 15 near the open end 14, tongues 16 extending from the top of the closed end, and a base 17 recessed in from the box ends so that there is an elevated bottom 18 at the closed end when the box 11 rests on the ground (see FIG. 3). Also, a pair of locking lugs 19 extend laterally from opposite sides of the box 11. A typical scrap steel box embodies additional structure not relevant here, and it should be understood that the drawings and disclosure of the box 11 is somewhat schematic.

The carrier 10 includes a main frame 21 supported on ground engaging, fixed axle wheels 22 and powered, steerable wheels 23 forming part of a tractor 24 which is vertically pivoted about an axis 28 on the main frame 21 and which includes an engine 25 supplying both motive and hydraulic power to the carrier. The wheels 23 are mounted on arms 29 so that the wheel rolling axis crosses the axis 28, and actuators 30 are provided to vertically adjust the tractor 24 on the wheels while also cushioning the ride. Steering actuators 26 pivot the subassembly 24 providing the carrier 10 with excellent maneuverability, and because the turning axis 28 passes through the rolling axis of the wheels 23, turning the wheels does not laterally shift that end of the carrier. This facilitates positioning the carrier 10 about the box 11 without scraping or jamming. An operator's cab 27 is placed high on the main frame so as to afford good visibility.

In carrying out the invention, the main frame 21 includes a torque tube 31 positioned to fit beneath the box tongues 16, and the main frame is formed with an open end into which a support or tilt frame 32 is fitted. The tilt frame 32 is positionally suspended on the main frame and adapted to engage, support and lock onto the box 11 so as to prevent relative movement between the box and the carrier 10.

Figure 5:
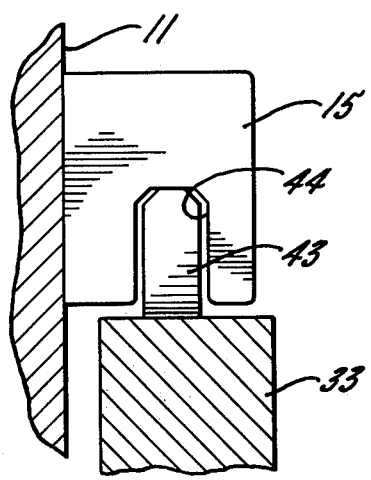
FIG. 5 is an enlarged fragmentary section taken along line 5—5 in FIG. 2.

Pursuant to the invention, the tilt frame 32 includes two side members 33 connected by a cross member 34 proportioned so that the frame 32 can be positioned with the side members 33 under the box support lugs 15 and the cross member 34 under the elevated box bottom 18. The side members 33 and the support lugs have linearly engaging guide bar portions 43, formed on the side members, and groove portions 44, formed in the lugs (see FIG. 5). A pair of linear actuators 36 suspend the cross member end of the tilt frame 32 on the main frame 21 by being connected between pivot points 37 on the main frame and the upper end of a pair of towers 38 forming part of the support frame 32.

The opposite end of the support frame 32 is supported by the ends of the side members 33 being pivotally affixed to respective ones of a pair of levers 39 which are pivoted at 41 on the main frame. A second pair of actuators 42 are mounted on the main frame 21 and connected to the levers 39 so as to pivot them about the points 41 to raise and lower the support frame side members 33. It will also be seen that the coupling of the support frame 33 to the main frame 21 through the levers 39 gives horizontal stability to the mounting of the support frame.

Figure 2:
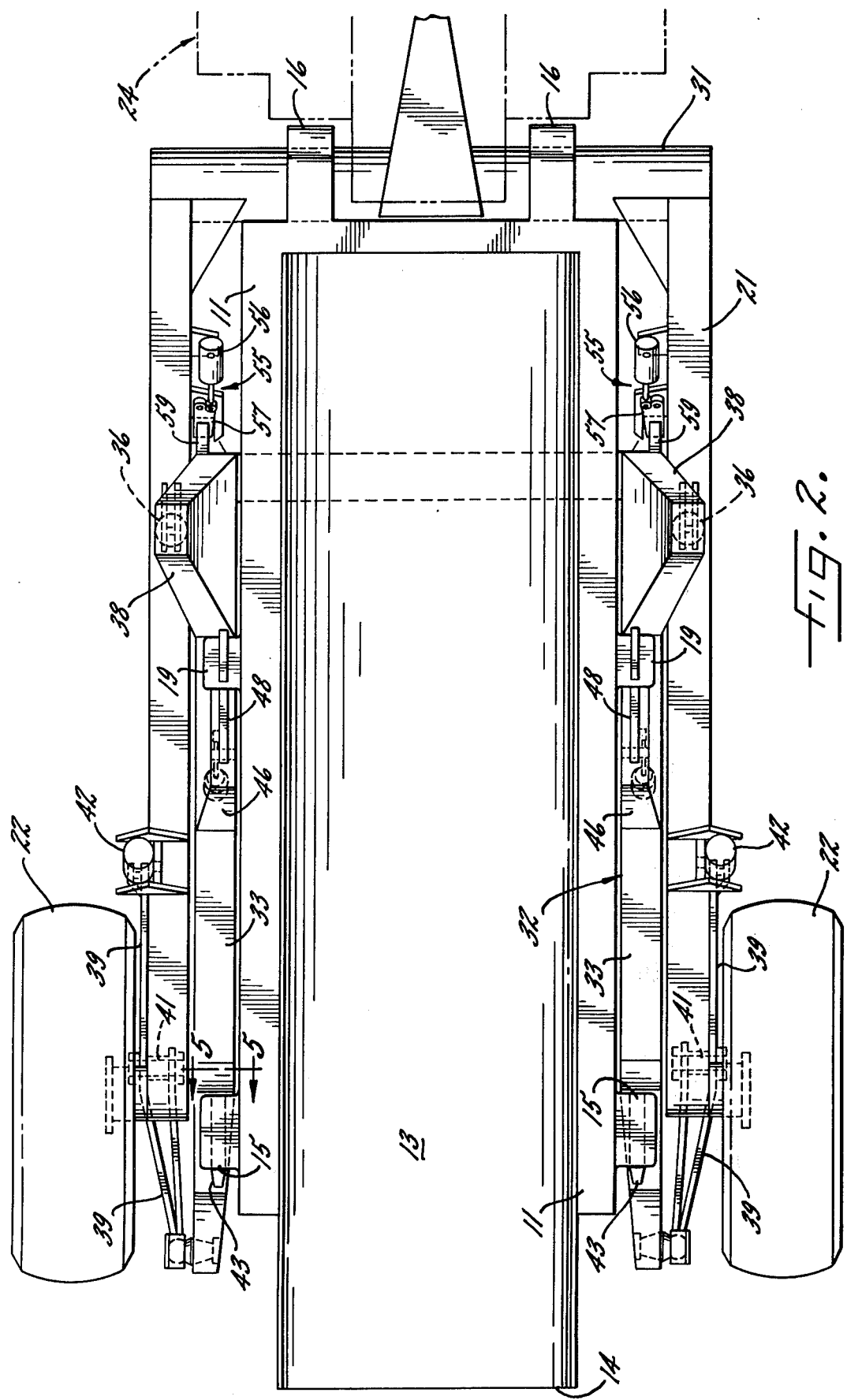
FIG. 2 is a slightly enlarged fragmentary plan of the carrier and box shown in FIG. 1.

The inter-engagement of the guide bars 43 within the slots 44 stabilizes the otherwise open end of the tilt frame 32 by, in effect, making the box 11 a structural member laterally locking the side members 33 and thus preventing heavy loads from tending to separate both the open ends of the side members 33 and the supporting open end of the frame 21 furthest from the torque tube 31. The levers 39, as best seen in FIG. 2, are formed of double bars running from ball joint connections with the side members 33 to a laterally spread pivot structure at 41, thus providing good resistance to side-to-side loads on the levers 39.

As an additional feature of the invention, a pair of locks are provided for engaging the laterally extending box lock lugs 19, with each lock including structure 46 on the support frame defining an open-ended throat 47 for surrounding three sides of the lugs 19 when the support frame is positioned with its side members 33 under the lugs 15 and the cross member 34 under the elevated box bottom 18. A latch 48 is pivoted on the structure 46 for swinging movement so that a latch lug 49 engages a stop in the form of a portion of the structure 46, in which position the latch 48 closes the throat 47 and surrounds the fourth side of the lug 19.

The latch 48 is pivoted at 51 and the latch pivot axis and the stop defined by the lug 49 are positioned so that force exerted by the lug 19 against the latch 48 urges the stop lug 49 against its stop surface, thus positively resisting relative movement of the lug 19 and the tilt frame 32. In the preferred construction, an actuator 52 is provided for positioning the latch 48. Each lock for each lug 19 is identical.

The lock lugs 19 and the cooperating structure defining each throat 47 are positioned so that the tilt frame is suspended on the lugs 19 when the box tongues 16 rest on the torque tube 31.

The linear actuators 36 are multiple piston actuators having sufficient reach to move the cross member 34 from a lower position beneath the elevated bottom 18 when the box 11 is resting on the ground to a high position which pivots the support frame on the levers 39 to a steeply inclined, box dumping angle shown in dashed lines in FIG. 1. The second pair of actuators 42 are able to pivot the levers 39 through a sufficient arc to move the side members 33 from a lower position beneath the support lugs 15 when the box 11 is resting on the ground to a high position holding the box on the subframe 32, with the box tongues 16 resting on the torque tube 31, and with the entire box 11 tilted at a slight angle with the open end 14 high, as shown in solid lines in FIG. 1. This latter position insures that the scrap contents of the box 11 will not spill while the box is being transported.

If the carrier is to be moved without a box in position, the actuators 36 are extended to lift the tilt frame 32 from the ground and an additional pair of laches 55 are operated, through actuators 56, which swing keepers 57 into slots 58 formed in plates 59 on the frame 32. This locks the tilt frame 32 to the main frame 21 when no box is being carried enabling the loads on the actuators 36 to be relieved.

Figure 3:
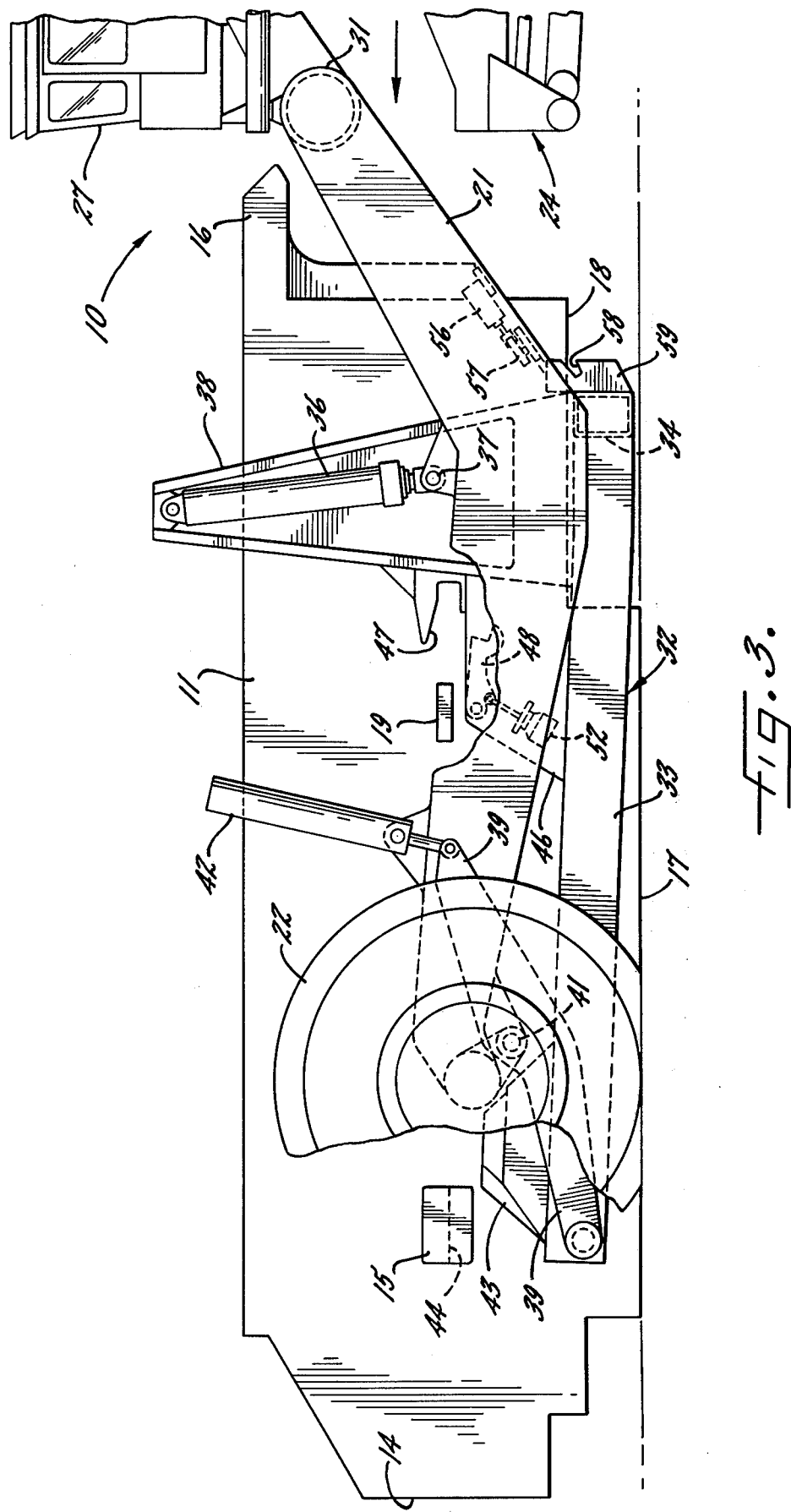
FIG. 3 is a fragmentary side elevation of the carrier of FIG. 1 moving into position to engage a box resting on the ground.
Figure 4:
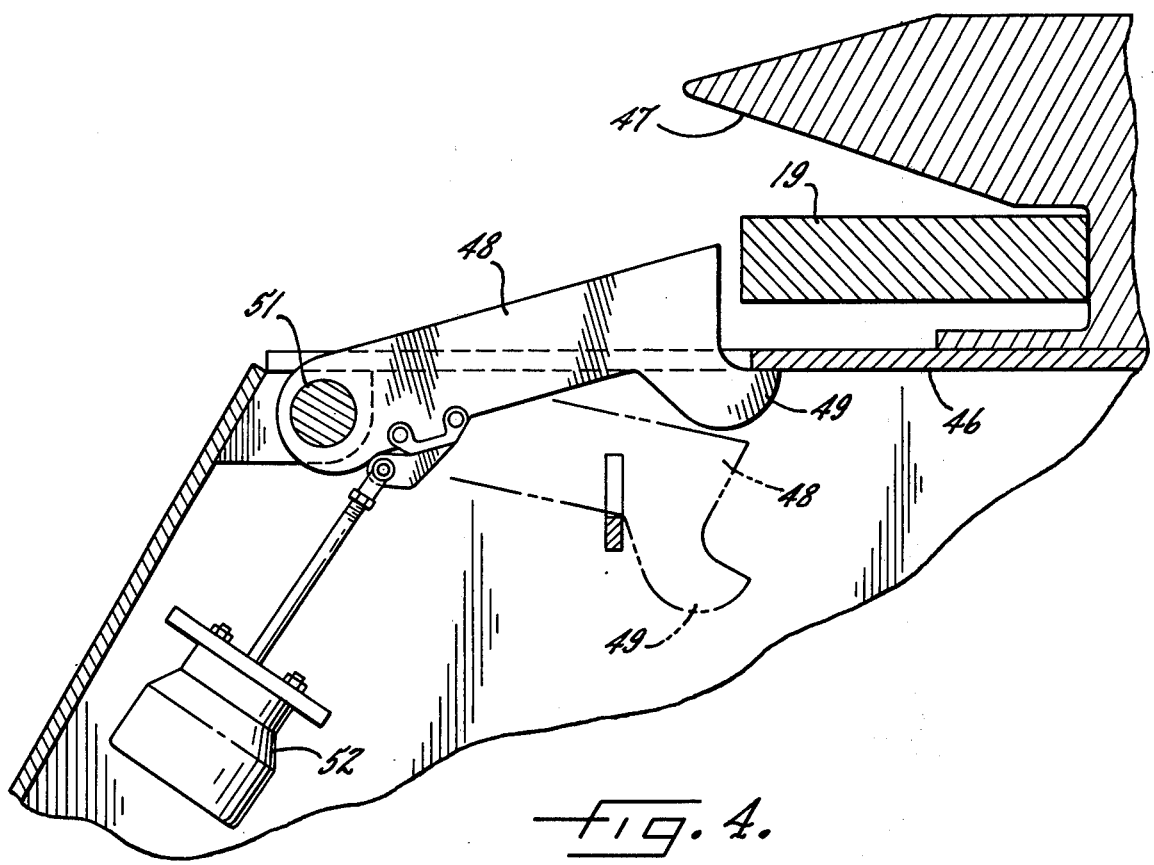
FIG. 4 is an enlarged fragmentary section of one of the lock mechanisms embodied in the carrier of FIG. 1.

In operation, a box 11 is approached as suggested in FIG. 3 with the tilt frame 32 lowered and the carrier 10 maneuvered so that the tilt frame moves into position around each side of the box. When properly positioned, the actuators 42 are extended to swing the levers 39, and the actuators 36 are slightly extended, so that the box is lifted to the solid line FIG. 1 position. Further ground clearance is obtained by slightly extending the actuators 30, which thereafter cushion the ride of the tractor 24. Forward sliding movement of the box is prevented by the solid engagement of the closed end with the torque tube 31 and it will be appreciated that with the box tongue 16 resting on the torque tube the only support load borne by the tilt frame 32 is through the support lugs 15, and that load is borne by the levers 39 held in position by the actuators 42 acting with the mechanical advantage provided by the levers 39.

In the process of positioning the tilt frame 32, the lugs 19 enter the open throats 47 of the locks and the actuators 52 complete the locking action when the carrier is in position. The tilt frame 34, being suspended on the locking lugs 19, does not through the actuators 36 bear the load of the box 11.

With the box 11 so supported, it can be transported at quite reasonable speed even when heavily loaded and, if desired, the lifting procedure can be reversed to lower the box onto a weighing scale where the carried weight of the steel scrap can be trimmed to the desired amount. After trimming, the carrier 10 again lifts the box 11 and transports it to a position adjacent the steel converting vessel whereupon the actuators 36 are fully extended to dump the scrap into the vessel 12. The lock latches 48 securely hold the box during the dumping operation. When the dumping is complete, the actuators 36 are contracted and the box 11 can be quickly returned for another cycle.

Those skilled in this art will appreciate that the carrier 10, while obviously scaled to carry heavy loads, is nevertheless relatively light and, in an actual embodiment, the carrier 10 has an empty weight of much less than an empty scrap box. It will be evident that the scrap boxes are handled without additional lifts or auxiliary cranes. The rubber tired hauling capability of the carrier 10 gives the unit good carrying speed even when heavily loaded and, as described above, the load on the hydraulic system is minimized when the carrier is transporting the box during which time, of course, maximum pay load forces are to be expected.

I claim as my invention:

1. A carrier for handling scrap steel boxes having an open end, side support lugs, and a tongue and elevated bottom at the non-open end, comprising, in combination, a rigid tilt frame having two side members connected by a cross member proportioned so that the frame can be positioned with said side members under said box support lugs, a main frame supported on ground engaging wheels and having an open end into which said tilt frame is fitted, a pair of linear actuators suspending one end of said tilt frame on said main frame, a pair of levers pivoted on said main frame with each lever being pivoted to and supporting the ends of said two side members, and a second pair of actuators mounted on said main frame and connected for pivoting said levers so as to raise and lower said tilt frame side members, said box side support lugs and said support frame side members having linear longitudinally extending guide bar portions and linear U-shaped groove portions which interlock with the bar portions in said groove portions upon relative horizontal movement so that a box in said tilt frame laterally resists spreading of the open end of said frame, said linear actuators being directly coupled between said tilt frame and main frame approximately tangent to the tilt frame pivot arc and having sufficient reach to move said cross member from a lower position beneath the elevated bottom of a box resting on the ground to a high position which pivots said tilt frame on said levers to a steeply inclined, box dumping angle, and said second pair of actuators being able to pivot said levers through a sufficient arc to move said side members from a lower position beneath the support lugs of a box resting on the ground to a high position holding the box on the tilt frame with said bar and groove portions interengaged and the box at a slight angle with the open end high.

2. The combination of claim 1 including a lock for engaging a laterally extending lock lug on said box, said lock including structure on said tilt frame defining an open-ended throat for surrounding three sides of said lock lug when said tilt frame is positioned with the side members under the support lugs, a latch pivoted on said structure for swinging movement against a stop to close said throat and surround the fourth side of said lock lug, said latch pivot axis and stop being positioned so that force exerted by the lock lug against the latch urges the latch against its stop, and means for swinging said latch between said stop and a position clear of said throat.

3. The combination of claim 1 in which certain of said ground engaging wheels are steerable and powered for guiding and propelling said main frame.

4. The combination of claim 3 in which said steerable wheels rotate on a vertical axis that passes through the axis of rotation of the wheels so that turning the wheels does not laterally shift the carrier.

5. The combination of claim 3 including means for vertically positioning said steerable wheels relative to said main frame so as to increase ground clearance of a box suspended on the carrier.

6. A carrier for handling scrap steel boxes having an open end, side support lugs, and a tongue and elevated bottom at the non-open end, comprising, in combination, a rigid tilt frame having two side members connected by a cross member proportioned so that the frame can be positioned with said side members under said box support lugs and said cross member under said elevated bottom, a main frame supported on ground engaging wheels and having an open end into which said tilt frame is fitted, the front end of said main frame having a torque tube positioned to fit beneath said box tongue for engagement therewith, a pair of linear actuators suspending the cross member end of said tilt frame on said main frame, a pair of levers pivoted on said main frame with each lever being pivoted to and supporting the ends of said two side members, and a second pair of actuators mounted on said main frame and connected for pivoting said levers so as to raise and lower said tilt frame side members, said box and said tilt frame having stop surfaces which interengage to prevent the box from sliding on said tilt frame away from said cross member, said linear actuators being directly coupled between said tilt frame and main frame approximately tangent to the tilt frame pivot arc and having sufficient reach to move said cross member from a lower position beneath the elevated bottom of a box resting on the ground to a high position which pivots said tilt frame on said levers to a steeply inclined, box dumping angle, and said second pair of actuators being able to pivot said levers through a sufficient arc to move said side members from a lower position beneath the support lugs of a box resting on the ground to a high position holding the box on the tilt frame at a slight angle with the open end high with said tongue resting on said torque tube in load bearing engagement.

7. The combination of claim 6 in which said support lugs and said side members have linearly engaging guide bar portions and groove portions which interlock so that a box in said tilt frame laterally locks said side members against spreading under load.

8. The combination of claim 6 including a lock for engaging a laterally extending lock lug on said box, said lock including structure on said tilt frame defining an open-ended throat for surrounding three sides of said lock lug when said support frame is positioned with the side members under the support lugs and the cross member under the elevated box bottom, a latch pivoted on said structure for swinging movement against a stop to close said throat and surround the fourth side of said lock lug, said latch pivot axis and stop being positioned so that force exerted by the lock lug against the latch urges the latch against its stop, and means for swinging said latch between said stop and a position clear of said throat.

9. The combination of claim 8 in which said lock lug and said open throat are positioned so that said tilt frame is suspended on said lug when said box tongue rests on said torque tube.

10. The combination of claim 9 including a latch for locking said tilt frame up into said main frame so as to provide ground clearance when no box is being carried by the carrier.

* * * * *